(12) United States Patent
Bayadroun

(10) Patent No.: US 6,798,178 B1
(45) Date of Patent: Sep. 28, 2004

(54) METHOD OF FORMING A POWER SYSTEM AND STRUCTURE THEREFOR

(75) Inventor: Abdesselam Bayadroun, Tournefeuille (FR)

(73) Assignee: Semiconductor Components Industries, L.L.C., Phoenix, AZ (US)

(*) Notice: Subject to any disclaimer, the term of this patent is extended or adjusted under 35 U.S.C. 154(b) by 0 days.

(21) Appl. No.: 10/388,252

(22) Filed: Mar. 12, 2003

(51) Int. Cl.[7] .............................................. G05F 1/40
(52) U.S. Cl. ...................................... 323/274; 323/284
(58) Field of Search ................................ 323/273, 274, 323/282, 284

(56) References Cited

U.S. PATENT DOCUMENTS 6,150,798 A * 11/2000 Ferry et al. ................. 323/273
6,229,289 B1 * 5/2001 Piovaccari et al. .......... 323/268
6,452,368 B1 9/2002 Basso et al.

* cited by examiner

Primary Examiner—Michael Sherry
Assistant Examiner—Gary L. Laxton
(74) Attorney, Agent, or Firm—Robert F. Hightow

(57) ABSTRACT

A power controller (10) of a power system switches between operating in a linear operational mode and a non-linear operational mode. The power controller (10) disables an output transistor (40) and removes a linear drive signal from the output transistor (40) to terminate operation in the linear operational mode. Prior to enabling operation in the non-linear operational mode, the power controller (10) adjusts a value of an error voltage in order to minimize overshoot in the output voltage during the mode switch.

19 Claims, 3 Drawing Sheets

METHOD OF FORMING A POWER SYSTEM AND STRUCTURE THEREFOR

BACKGROUND OF THE INVENTION

The present invention relates, in general, to electronics, and more particularly, to methods of forming semiconductor devices and structure.

In the past, the semiconductor industry utilized various methods for implementing and operating power systems including power systems for DC-to-DC conversion. Some previous power systems switched between operating in a linear operating mode and a pulse width modulated operating mode depending on the requirements of the output voltage and current. Typically the power system would operate in a linear operating mode to provide accuracy and then switch to a pulse width modulated operating mode when large currents were required. One problem with such previous power systems was voltage regulation. When the power system would switch from the linear operating mode to the pulse width modulated operating mode, there was a large overshoot or fluctuation in the output voltage. Typically this fluctuation was greater than 100 milli volts. For low power supply voltages, such as 2.5 V, such large voltage fluctuations were undesirable.

Accordingly, it is desirable to have a power system that can switch between a linear operating mode and a pulse width modulated operating mode with small fluctuations in the output voltage.

For simplicity and clarity of illustration, elements in the figures are not necessarily to scale, and the same reference numbers in different figures denote the same elements. Additionally, descriptions and details of well known steps and elements are omitted for simplicity of the description. As used herein current carrying electrode means an element of a device that carries current through the device such as a source or a drain of an MOS transistor or an emitter or a collector of a bipolar transistor, and a control electrode means an element of the device that controls current through the device such as a gate of an MOS transistor or a base of a bipolar transistor.

DETAILED DESCRIPTION OF THE DRAWINGS

Figure 1:
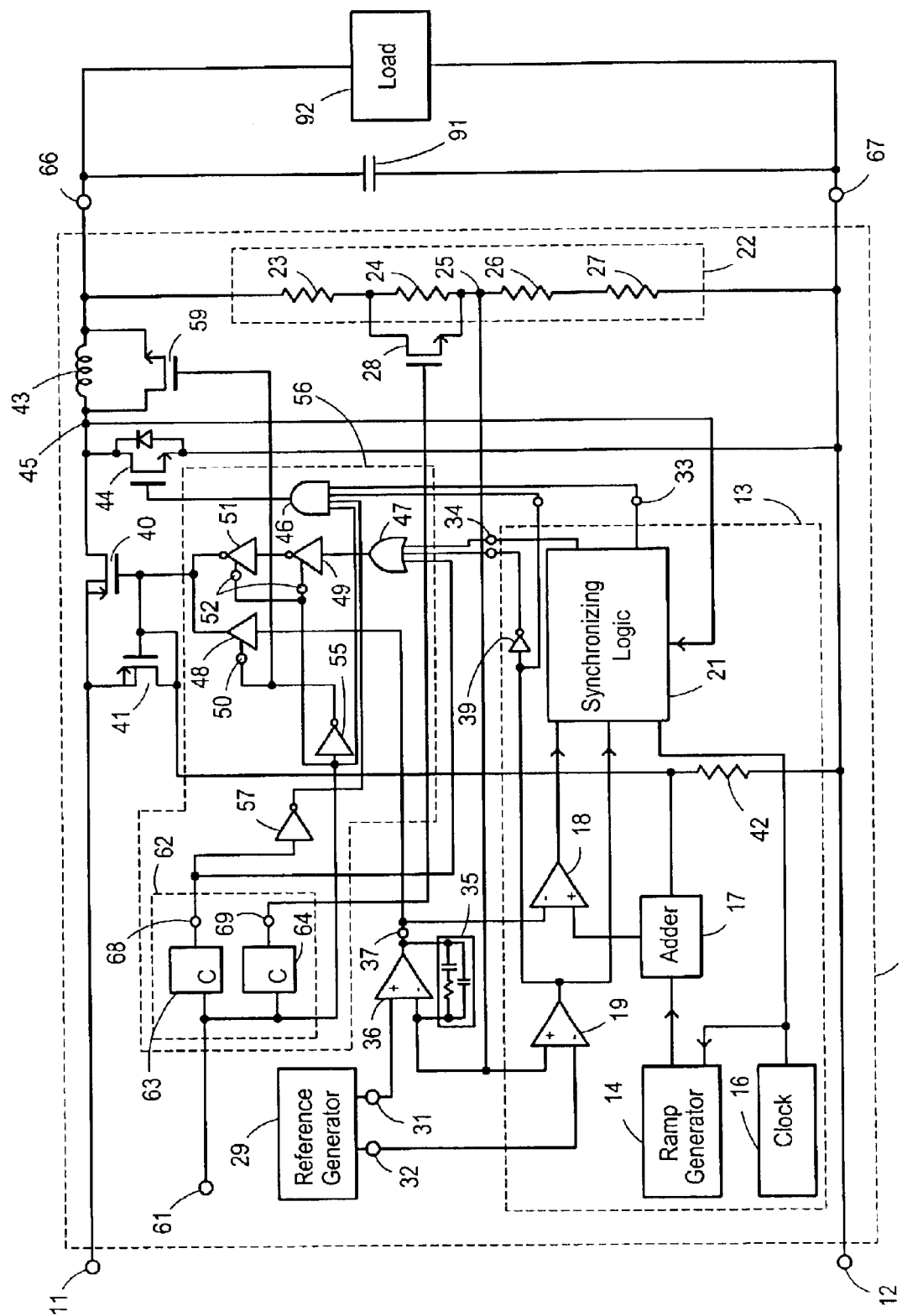
FIG. 1 schematically illustrates an embodiment of a portion of a power control system in accordance with the present invention.

FIG. 1 schematically illustrates a portion of an embodiment of a power system that includes a power controller 10 that switches between operating in a linear operational mode and a non-linear operational mode. Controller 10 receives an input voltage that is applied between a voltage input 11 and a voltage return 12, and provides an output voltage between a voltage output 66 and a voltage return 67. The power system typically includes a filter capacitor 91 that is connected between output 66 and return 67 in order to filter the output voltage, and a load 92 that receives the output voltage. In the preferred embodiment, controller 10 is a portion of a cellular telephone that is powered by controller 10 and load 92 is another portion of the cellular telephone. Controller 10 includes an output transistor 40 that receives the input voltage and assists in generating the output voltage. Power controller 10 has a linear section that is formed to operate transistor 40 in the linear operational mode and a non-linear section 13, generally illustrated by a dashed box, that is formed to operate transistor 40 in the non-linear operational mode. Non-linear section 13 may be formed as any one of several types of functional blocks that are commonly referred to as operating in a non-linear mode including a switching power supply controller, a pulse width modulated (PWM) controller, a buck converter, a boost converter, or a charge pump converter. In the preferred embodiment, section 13 is a pulse width modulated switching controller. Non-linear section 13 typically is formed to include a clock 16, a ramp generator 14, an adder 17, an over-voltage comparator 19, a switching control comparator 18, and synchronizing logic 21. Section 13 is formed to generate a non-linear drive signal on an output 34. Section 13 may include other well known functions and circuits such as soft-start, under voltage lock-out, thermal protection, current-mode control, or voltage-mode control. Such non-linear sections are well known to those skilled in the art.

The linear section is formed to generate a linear drive signal to drive transistor 40. In the preferred embodiment, the linear drive signal is formed from an error voltage produced on an output 37 of an error amplifier 36. One example of a controller that switches between linear and non-linear operation and includes a non-linear section is disclosed in U.S. Pat. No. 6,452,368 issued to Basso et. al. on Sep. 17, 2002, which is hereby incorporated herein by reference.

A sense network 22 is connected between output 66 and return 67 to provide a sense voltage or feedback voltage on a sense node 25. In the preferred embodiment, network 22 is a resistor divider chain that includes sense resistors 23, 24, 26, and 27 connected in series between output 66 and return 67. In this preferred embodiment, node 25 is the centermost node of the divider chain. A feedback adjust transistor 28 is connected in parallel across resistor 24 to facilitate adjusting the value of the error voltage as will be further explained hereinafter. A reference generator 29 provides various reference voltages that are used during the operation of controller 10. Generator 29 preferably is a bandgap reference generator. Generator 29 is formed to generate an error amplifier reference voltage on an output 31 and an over-voltage reference voltage on an output 32. Error amplifier 36 receives the feedback voltage from node 25 and receives the error amplifier reference voltage and forms the error voltage on output 37. The error voltage is used by non-linear section 13 and by the linear section during the operation of controller 10.

An inductor 43 is connected between transistor 40 and output 66 to facilitate providing the output voltage during the non-linear operational mode. Preferably, inductor 43 is external to controller 10. A current sense transistor 41 is utilized to provide a current sense signal that is representative of the current flowing through transistor 40. The current sense signal is received by adder 17 of non-linear section 13 and is used by section 13 to facilitate forming the non-linear drive signal. In the preferred embodiment, transistor 41 is formed to have a size and operational characteristics that are ratioed to the size and characteristics of transistor 40 in order to mirror the current flowing through transistor 40. Such a transistor often is referred to as a ratioed transistor. In this preferred embodiment, transistor 40 is a P-channel power MOSFET and transistor 41 is a P-channel MOS transistor. In other embodiments, transistor 40 may be a sense FET or other similar transistor that includes the functionality of transistor 41. A current sense resistor 42 is coupled to transistor 41 to translate the current through transistor 41 into a voltage that forms the current sense signal. Synchronizing logic 21 generally is formed to receive control signals from other portions of section 13 and generate the non-linear drive signal. Logic 21 generally has a suppression output 33 that facilitates controlling a synchronous rectifier 44. When operating in the non-linear operational mode, output 33 is low when transistor 40 is enabled in order to disable rectifier 44. Subsequently when transistor 40 is disabled, output 33 goes high a short time period thereafter, preferably after about ten nano-seconds (10 nsec), to facilitate enabling rectifier 44 and discharging inductor 43. When the current through inductor 43 nears zero, output 33 goes low again to disable rectifier 44. Logic 21 senses the current through inductor 43 through a connection to a node 45. When controller 10 is operating in the linear operational mode a mode control signal is used to disable rectifier 44 as will be seen hereinafter.

A disable circuit 56 is formed to switch controller 10 between the linear operational mode and the non-linear operational mode. Circuit 56 includes a timing circuit 62, inverters 55 and 57, an AND gate 46, an OR gate 47, an analog buffer 48, and a pair of digital buffers 49 and 51. Analog buffer 48 has an enable input 50 that is used to enable operation of buffer 48. When input 50 is low, buffer 48 is disconnected from power input 11 and from return 12 to ensure that the input and output of buffer 48 is in a high impedance state. Disconnecting buffer 48 from the power connections facilitates the high impedance state and does not place extra resistance in the signal paths of buffer 48. Similarly, buffers 49 and 51 have an enable input 52 that functions similarly to input 50 of buffer 48. The polarity of enable signals 50 and 52 may be changed with appropriate changes in the logic of the control signals both internal and external to buffers 48, 49, and 51. Timing circuit 62 is formed to receive the mode control signal on mode control input 61 and responsively generate timing signals that are used by circuit 56 for switching controller 10 from the linear operational mode to the non-linear operational mode including terminating the linear operational mode, delaying a first time period, and enabling the non-linear operational mode. The mode control signal typically is generated by other circuitry, not shown, such as by a micro-controller external to controller 10. In the preferred embodiment, timing circuit 62 includes a one-shot 63 that generates a disable signal on an output 68 and a one-shot 64 that generates an adjust signal on an output 69. As will be seen hereinafter, the disable signal forms a first time period and the adjust signal forms a second time period. In other embodiments the timing signals may be generated by other circuits for example from counters that are clocked by the output of clock 16. Disable circuit 56 receives the linear drive signal from output 37 and the non-linear drive signal from output 34 and selectively couples the signals to drive transistor 40. Analog buffer 48 receives the linear drive signal and drives transistor 40 with the linear drive signal, and digital buffers 49 and 51 receive the non-linear drive signal and drive transistor 40 with the non-linear drive signal.

Figure 2:
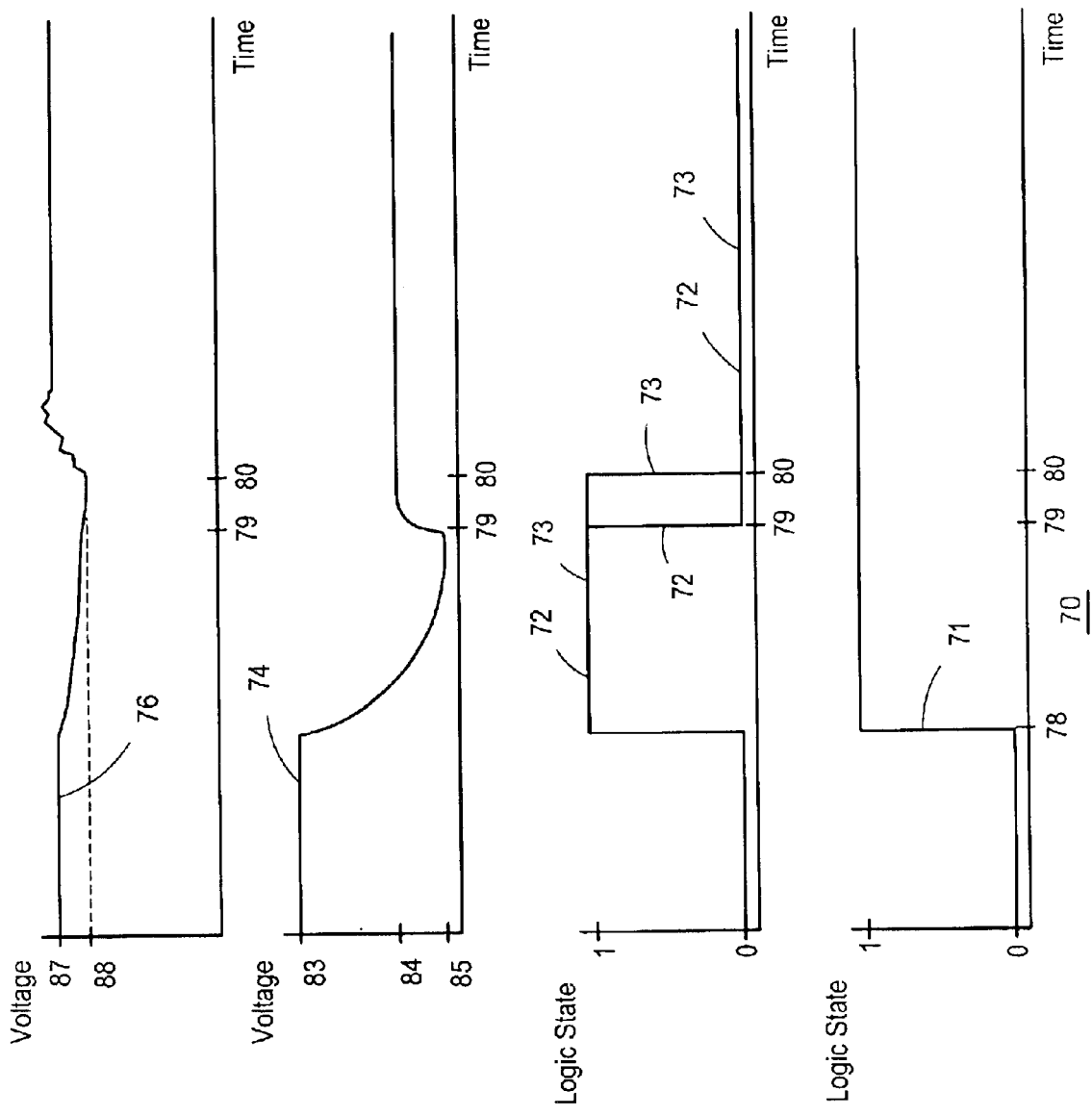
FIG. 2 is a graph schematically illustrating an embodiment of some of the operational signals of a power controller of FIG. 1 in accordance with the present invention.

FIG. 2 is a graph having a family of plots that graphically illustrate some of the operating signals of controller 10. The ordinate of each plot represents the value of different signals and the abscissa represents time. For clarity, this description of FIG. 2 will have references to both FIG. 1 and FIG. 2. A plot 71 illustrates the logical value of the mode control signal applied to input 61. A plot 72 illustrates the logical value of the adjust signal on output 69 and a plot 73 illustrates the logical value of the disable signal on disable output 68. A plot 74 illustrates the value of the error voltage on output 37 of amplifier 36, and a plot 76 illustrates the value of the output voltage on output 66.

As those skilled in the art will understand, the error voltage typically is much larger in the linear operation mode than in the non-linear operational mode. When operating in the linear operational mode, the error voltage, in general, depends on the input voltage and the feedback voltage. When operating in the non-linear operational mode, the value of the error voltage is, in general, approximately equal to the value of the output of adder 17. For example, the error voltage may be near to about one and eight-tenths volts (1.8 V) in the linear operational mode and near to about one volt in the non-linear operational mode. Thus the value of the error voltage must change a large amount when changing between the linear and the non-linear operational modes. In order to minimize overshoot and other fluctuations in the output voltage while the error voltage is changing, controller 10 terminates driving transistor 40 while adjusting the value of the error voltage as will be seen hereinafter.

In operation, as illustrated by FIG. 2, the mode control signal is low or at a logic zero prior to a time 78. When the mode control signal is zero, disable circuit 56 applies the linear drive signal to transistor 40 through buffer 48. With the mode control signal zero, both outputs 68 and 69 of circuit 62 are also logic zeros. Inverter 55 receives the logic zero of the mode control signal and applies a logic one to input 50 in order to enable buffer 48 which amplifies the linear drive signal and applies the amplified linear drive signal to the gate of transistor 40. Inverter 55 also applies a logic one to transistor 59 which enables transistor 59 to short across inductor 43 thereby facilitating transistor 40 driving output 66 in the linear operational mode. Buffers 49 and 51 are disabled by the low mode control signal thereby preventing buffers 49 and 51 from driving transistor 40 with the non-linear drive signal. The low mode control signal drives the output of gate 46 low to disable rectifier 44 during the linear operational mode. Gate 46 should have a large drive capability in order to drive rectifier 44, alternatively, additional buffers may be used between gate 46 and rectifier 44. Since output 69 is also low, transistor 28 is disabled to allow amplifier 36 to receive the feedback voltage. The output voltage is at a voltage value 87 as illustrated in FIG. 2.

At time 78 the mode control signal transitions to a logic one which causes circuit 56 to terminate operating controller 10 in the linear operational mode and to delay for a first time period prior to enabling operation in the non-linear operational mode. This delay facilitates adjusting the value of the error voltage. As illustrated by plots 72 and 73, the logic one transition of the mode control signal fires one-shots 63 and 64 causing outputs 68 and 69 to become a logic one or high. The high on the mode control signal drives the output of inverter 55 low which disables buffer 48 thereby disconnecting the linear drive signal from transistor 40 and terminating the linear operational mode. The low from inverter 55 also disables transistor 59 which connects inductor 43 in series between transistor 40 and output 66 so that inductor 43 is prepared for the non-linear operational mode. The output of gate 47 is driven high by the high of the disable signal on output 68. The high mode control signal enables buffers 49 and 51 to apply the high from gate 47 to the gate of transistor 40 thereby disabling transistor 40. Thus, disable circuit 56 disconnects the linear drive signal from transistor 40 and also disables transistor 40 from operating. Gate 46 receives a low from inverter 57 which drives the output of gate 46 low and disables rectifier 44 during the first time period.

Referring to plot 74, the high on output 69 enables transistor 28 which shorts out resistor 24 from the divider network thereby rapidly increasing the value of the feedback voltage and causing a corresponding rapid decrease in the error voltage at output 37. Plot 74 illustrates that at time 78 the value of the error voltage is at a first value 83. After time 78 the error voltage begins to decrease toward a second value 85. The rate at which the error voltage decreases is a function of various factors including the difference between the feedback voltage and the error amplifier reference voltage and a compensation network 35 that typically is connected to amplifier 36. Such compensation networks are well known to those skilled in the art. Plot 76 illustrates that at time 78 the value of the output voltage on output 66 begins to slowly decrease since load 92 is still requiring current. At a time 79 the second time period established by one-shot 64 expires and output 69 becomes a zero as illustrated by plot 72. The zero disables transistor 28 thereby changing the value of the feedback voltage to a value that represents the value of the output voltage on output 66 at time 79. Plot 74 illustrates that at time 79 the value of the error voltage has decreased to second value 85 and at time 79 begins to rapidly increase to a third value 84. However, as illustrated by plot 76 the output voltage continues to slowly decrease since transistor 40 and rectifier 44 are still disabled. At time 80, the first time period establish by one-shot 63 expires and circuit 56 enables operation in the non-linear operational mode. When the first time period expires, output 68 becomes a zero. Gate 47 receives logic zero inputs from output 68 and from inverter 39 of section 13. These two low inputs enable the output of gate 47 to reflect the value of the non-linear drive signal on output 34 of section 13 and apply this signal to the input of buffer 49. Buffers 49 and 51 remain enabled by the high mode control signal thereby coupling the non-linear drive signal to the gate of transistor 40. Gate 46 receives logic one inputs from the mode control signal, inverter 57, and from comparator 19 thereby facilitating output 33 of section 13 controlling rectifier 44 as discussed hereinbefore. As illustrated by plot 74, the error voltage has reached third value 84 when transistor 40 is enabled. The third value is approximately equal to the value of the output of adder 17. Also, plot 76 illustrates that the output voltage begins to increase in a stepwise waveform from a low value 88 to the desired value 87. Rapidly changing the value of the error voltage assists in minimizing overshoot in the output voltage when switching from the linear to the non-linear operating modes.

In one example of controller 10, the output voltage is established to be about one and one-half volts (1.5 V) with a maximum load current of about ten milli-amps (10 ma.). The corresponding first value 83 of the error voltage at time 78 is approximately one and eight-tenths of a volt (1.8 V). Typically, second value 85 is near to zero volts and third value 84 at time 80 is approximately one volt. Thus, it can be seen that the error voltage is adjusted over a large range. Without disabling transistor 40 and adjusting the error voltage via changing the feedback voltage it would take a long time to change the value of the error voltage and the output voltage would have an overshoot of about one hundred milli-volts. In this example, the overshoot is less than about five milli-volts. In order to ensure that the error voltage is adjusted to a value that is representative of the output voltage prior to enabling operation in the non-linear operational mode, the second time period typically is chosen to be no greater than the first time period. In the preferred embodiment the second time period established by one-shot 64 is less than the first time period established by one-shot 63. In this preferred embodiment, the first time period is approximately five micro-seconds and the second time period is approximately four micro-seconds.

Figure 3:
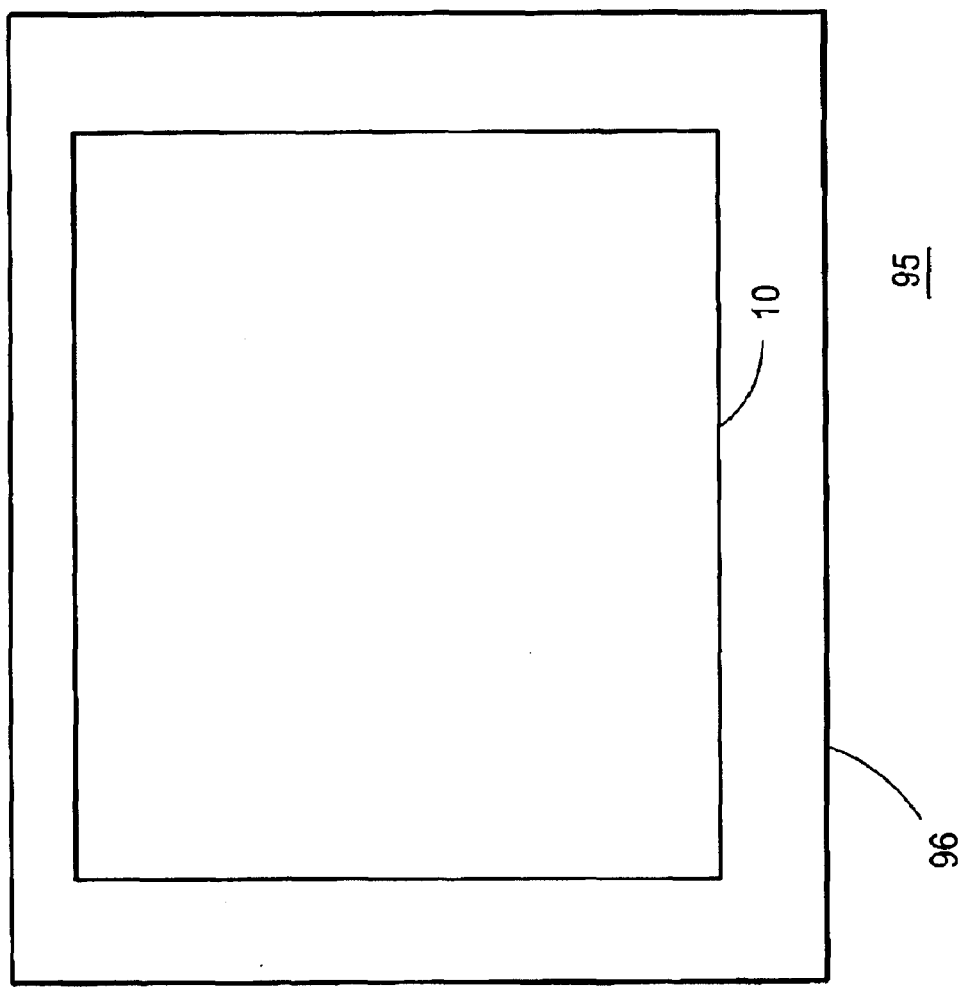
FIG. 3 schematically illustrates an enlarged plan view of a semiconductor device that includes the power system of FIG. 1 in accordance with the present invention.
Figure 1:
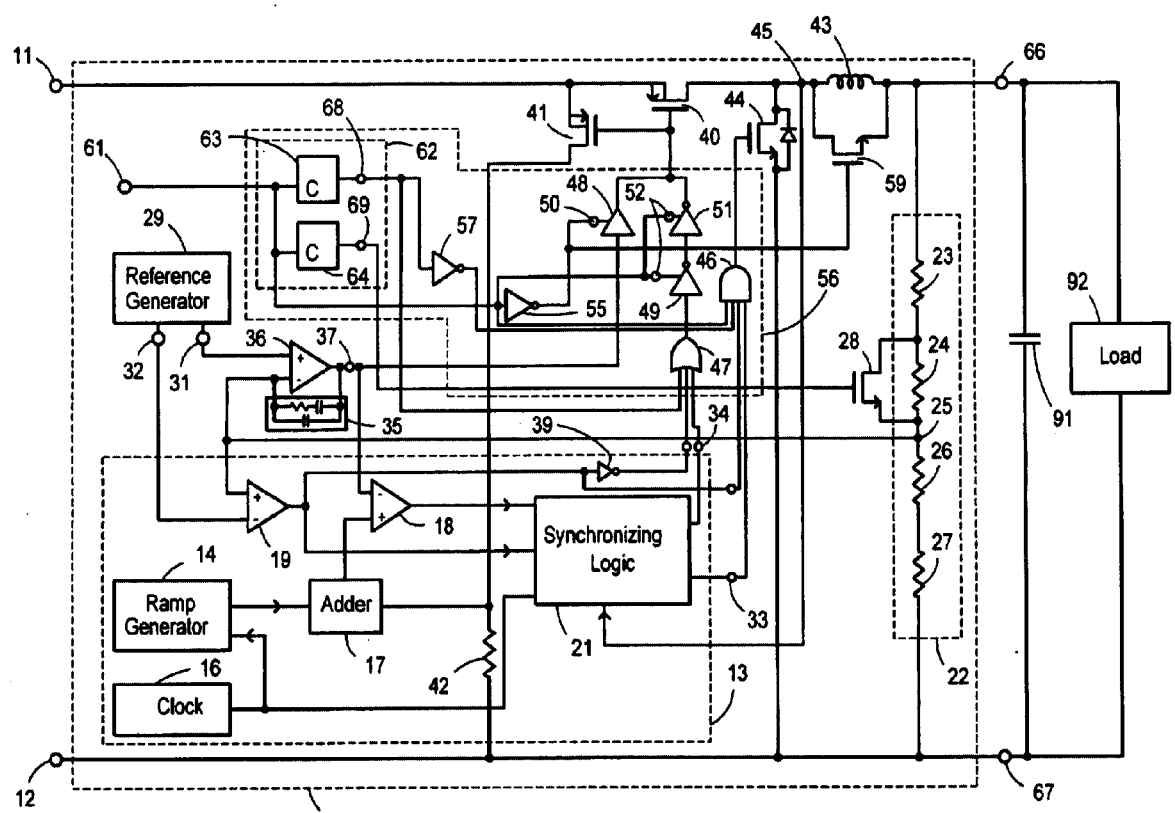

FIG. 3 schematically illustrates an enlarged plan view of a portion of an embodiment of a semiconductor device 95 that is formed on a semiconductor die 96. Controller 10 is formed on die 96. Die 96 may also include other circuits that are not shown in FIG. 3 for simplicity of the drawing.

In view of all of the above, it is evident that a novel device and method is disclosed. Included among other features is disabling operation in the linear operational mode, delaying a first time period, and enabling operation in the non-linear operational mode. Forming controller 10 to delay the first time period after terminating the linear operating mode and prior to enabling the non-linear operating mode provides a window for adjusting the value of the error voltage while minimizing overshoot and other fluctuations in the output voltage and typically maintains the fluctuations to less than five milli-volts (5 milli-volts).

While the invention is described with specific preferred embodiments, it is evident that many alternatives and variations will be apparent to those skilled in the semiconductor arts. For example, the non-linear section may be any of various types on non-linear sections. Also, various methods may be utilized to form the time periods, and to enable and disable the output transistor.

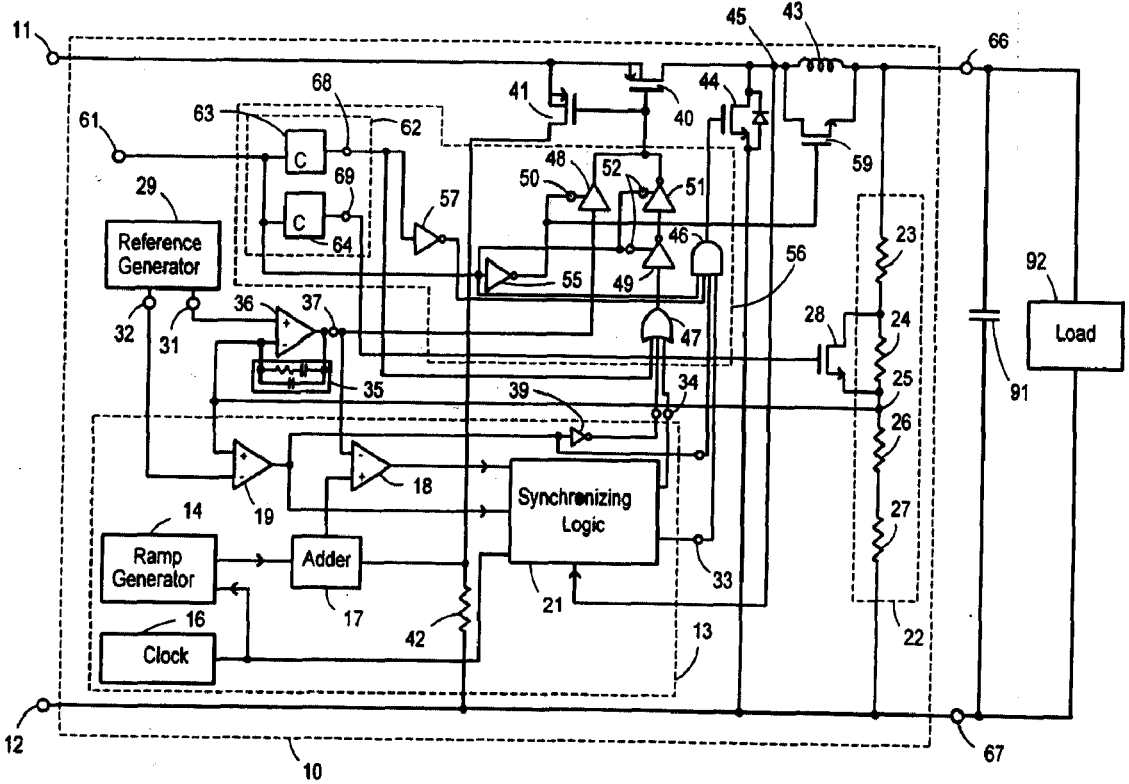

What is claimed is:

1. A method of forming a power system comprising:

forming the power system to operate an output transistor in a linear operational mode during a first operating mode of the power system and to operate the output transistor in a non-linear operational mode during a second operating mode of the power system; and forming the power system to change a value of an error amplifier output voltage from a first value while operating the output transistor in the linear operational mode to a second value prior to operating the output transistor in the non-linear operational mode.

2. The method of claim 1 wherein forming the power system to change the value of the error amplifier output voltage includes forming the power system to use the error amplifier output voltage for operating the output transistor in the linear operational mode and for operating the output transistor in the non-linear operational mode.

3. The method of claim 1 wherein forming the power system to change the value of the error amplifier output voltage includes forming the power system to delay a first time period after terminating the linear operational mode prior to enabling the non-linear operational mode.

4. The method of claim 3 wherein forming the power system to delay the first time period after terminating the linear operational mode prior to enabling the non-linear operational mode includes forming the power system to change a value of a sense voltage from a first sense voltage value prior to terminating the linear operational mode to a second sense voltage value after terminating the linear operational mode and to change the value of the sense voltage to a third sense voltage value after a second time period after terminating the linear operational mode wherein the second time period is no greater than the first time period.

5. The method of claim 4 wherein forming the power system to change the value of the sense voltage includes coupling a first one shot and a second one shot in parallel to receive a mode control signal and coupling an output of the first one shot to short out a resistor in a resistor divider while the first one shot is enabled and coupling the second one shot to disable the output transistor while the second one shot is enabled wherein the first one shot is enabled for the second time period and the second one shot is enabled for the first time period.

6. The method of claim 1 wherein forming the power system to change the value of the error amplifier output voltage from the first value while operating the output transistor in the linear operational mode to the second value prior to operating the output transistor in the non-linear operational mode includes decoupling the output transistor from a linear drive signal to terminate operation in the linear operational mode and coupling the output transistor to receive a non-linear drive signal to operate in the non-linear operational mode.

7. The method of claim 1 wherein forming the power system to change the value of the error amplifier output voltage from the first value while operating the output transistor in the linear operational mode to the second value prior to operating the output transistor in the non-linear operational mode includes forming the power system to change a value of a reference voltage from a first reference value prior to terminating the linear operational mode to a second reference value after terminating the linear operational mode and to change the value of the reference voltage to a third value prior to operating the output transistor in the non-linear operational mode.

8. The method of claim 7 wherein forming the power system to change the value of the reference voltage from the first reference value prior to terminating the linear operational mode to the second reference value after terminating the linear operational mode and to change the value of the reference voltage to the third value prior to operating the output transistor in the non-linear operational mode includes forming the power system to change a value of a resistor divider.

9. The method of claim 8 wherein forming the power system to change the value of the resistor divider includes forming the power system to short out a resistor in the resistor divider to change the reference voltage to the second reference value and to disable the short to change the value of the reference voltage to the third value.

10. The method of claim 9 wherein forming the power system to short out the resistor in the resistor divider to change the reference voltage to the second reference value and to disable the short to change the value of the reference voltage to the third value includes forming the power system to short out the resistor for a first time period and to enable operation in the non-linear operational mode after the first time period expires.

11. A method of operating a power system comprising:
generating an error voltage from an error amplifier; and
adjusting a value of the error voltage from a first value while driving an output transistor of the power system with a linear drive signal to a second value after terminating driving the output transistor with the linear drive signal and prior to driving the output transistor with a non-linear drive signal.

12. The method of claim 11 further including adjusting the value of the error voltage to a third value after the second value and after driving the output transistor with the non-linear drive signal.

13. The method of claim 11 wherein adjusting the value of the error voltage from the first value while driving the output transistor of the power system with the linear drive signal to the second value after terminating driving the output transistor with the linear drive signal includes disabling the output transistor and removing the linear drive signal from a control electrode of the output transistor.

14. The method of claim 13 wherein adjusting the value of the error voltage from the first value while driving the output transistor of the power system with the linear drive signal to the second value after terminating driving the output transistor with the linear drive signal and after driving the output transistor with the non-linear drive signal includes enabling the output transistor and coupling the non-linear drive signal to the control electrode of the output transistor.

15. A power controller comprising:
an output terminal;
an output transistor coupled to receive an input voltage and to form an output voltage on the output terminal, the output transistor having a control electrode, a first current carrying electrode, and a second current carrying electrode; and
a disable circuit coupled to receive a mode control signal and to responsively disable operation in a linear operational mode, delay a first time period, to adjust a value of an error voltage from a first value to a second value during the first time period, and enable operation in a non-linear operational mode after the first time period.

16. The power controller of claim 15 further including a resistor divider coupled to the output terminal wherein the resistor divider includes a plurality of resistors and a feedback adjust transistor coupled in parallel across one resistor of the plurality of resistors.

17. The power controller of claim 15 wherein the disable circuit includes a timing circuit that generates the first time period.

18. The power controller of claim 17 wherein the disable circuit includes a selectable analog buffer coupled to transfer a linear drive signal to the control electrode of the output transistor prior to disabling the linear operational mode and includes a selectable digital buffer to couple a non-linear drive signal to the control electrode of the output transistor after the first time period expires.

19. The power controller of claim 18 wherein the selectable analog buffer includes an enable input that disconnects the selectable analog buffer from a power source and power return.

* * * * *

UNITED STATES PATENT AND TRADEMARK OFFICE
CERTIFICATE OF CORRECTION

PATENT NO.    : 6,798,178 B1
DATED         : September 28, 2004
INVENTOR(S)   : Abdesselam Bayadroun It is certified that error appears in the above-identified patent and that said Letters Patent is hereby corrected as shown below:

The title page, showing an illustrative figure, should be deleted and substiute therefor the attached title page.

Delete Drawing sheet 1 and substitute therefor the Drawing sheet consisting of Fig 1 as shown on the attached page.

Signed and Sealed this

Thirtieth Day of August, 2005

JON W. DUDAS
*Director of the United States Patent and Trademark Office*

(12) United States Patent
Bayadroun

(10) Patent No.: US 6,798,178 B1
(45) Date of Patent: Sep. 28, 2004

(54) METHOD OF FORMING A POWER SYSTEM AND STRUCTURE THEREFOR

(75) Inventor: Abdesselam Bayadroun, Tournefeuille (FR)

(73) Assignee: Semiconductor Components Industries, L.L.C., Phoenix, AZ (US)

(*) Notice: Subject to any disclaimer, the term of this patent is extended or adjusted under 35 U.S.C. 154(b) by 0 days.

(21) Appl. No.: 10/388,252

(22) Filed: Mar. 12, 2003

(51) Int. Cl.$^7$ .................................................. G05F 1/40
(52) U.S. Cl. ........................................ 323/274; 323/284
(58) Field of Search .............................. 323/273, 274, 323/282, 284

(56) References Cited

U.S. PATENT DOCUMENTS 6,150,798 A * 11/2000 Ferry et al. ................. 323/273
6,229,289 B1 * 5/2001 Piovaccari et al. ........... 323/268
6,452,368 B1 9/2002 Basso et al.

* cited by examiner

*Primary Examiner*—Michael Sherry
*Assistant Examiner*—Gary L. Laxton
(74) *Attorney, Agent, or Firm*—Robert F. Hightow

(57) ABSTRACT

A power controller (10) of a power system switches between operating in a linear operational mode and a non-linear operational mode. The power controller (10) disables an output transistor (40) and removes a linear drive signal from the output transistor (40) to terminate operation in the linear operational mode. Prior to enabling operation in the non-linear operational mode, the power controller (10) adjusts a value of an error voltage in order to minimize overshoot in the output voltage during the mode switch.

19 Claims, 3 Drawing Sheets